No. 651,027. Patented June 5, 1900.
J. BERGERON.
DRAFT EQUALIZER.
(Application filed Sept. 30, 1899.)
(No Model.)
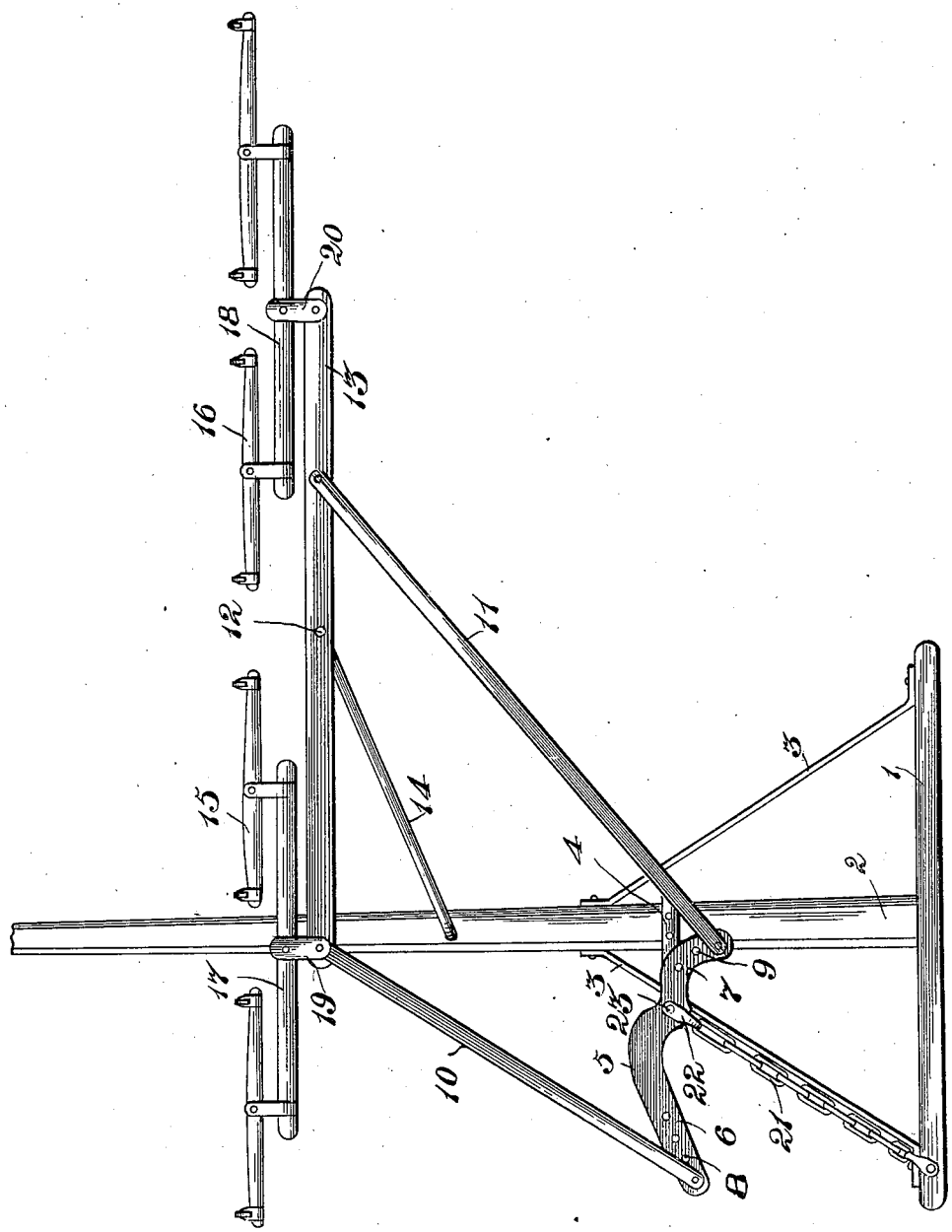
Witnesses
John Maupin
Louis G. Jaliha
By his Attorneys, C.A. Snow & Co.
Inventor
Jule Bergeron.

United States Patent Office.

JULE BERGERON, OF HASTINGS, NEBRASKA.

DRAFT-EQUALIZER.

SPECIFICATION forming part of Letters Patent No. 651,027, dated June 5, 1900.

Application filed September 30, 1899. Serial No. 732,208. (No model.)

*To all whom it may concern:*

Be it known that I, JULE BERGERON, a citizen of the United States, residing at Hastings, in the county of Adams and State of Nebraska, have invented a new and useful Draft-Equalizer, of which the following is a specification.

This invention relates to improvements in draft-equalizers. The general purpose of this type of vehicle attachments is to equalize the draft where a number of horses are harnessed, but at different distances from the line of direct draft. Various arrangements of levers and connected parts have been employed to secure this equalization of the efforts of the draft-animals, but the accomplishment of the desired result is ordinarily accompanied by more or less side draft, which, while equalizing the pull, serves to crowd the draft-animals, produces an unequal strain upon the collars, and sometimes causes the pole or tongue of the vehicle to be thrown more or less out of the line of draft.

The object of my invention is to equalize the efforts of the draft-animals and to cause the pull of each animal to be exerted in a direction parallel to the line of direct draft and to be communicated to the vehicle in a manner to prevent the objectionable side draft heretofore referred to.

In the drawing I have illustrated my evener applied to a vehicle-pole as in use.

Referring to the numerals of reference on the accompanying drawing, 1 indicates a portion of a vehicle-frame, and 2 the draft-pole, secured by braces 3, as usual. 4 indicates an equalizer-supporting bracket extending transversely from and rigidly secured to the pole adjacent to its rear end.

Fulcrumed upon the bracket 4 to one side of the tongue is an equalizer or equalizer-lever 5, the long and short arms 6 and 7 of which are curved in different degrees from the fulcrum to their ends. The arms 6 and 7 of the equalizer are respectively provided with series of apertures 8 and 9, designed for the adjustable connection of links or connecting-rods 10 and 11, extending from the opposite ends of the evener and pivotally connected at their front extremities at proper distances to either side of the medial fulcrum 12 of the front equalizer beam or lever 13, supported and fulcrumed at the outer end of a supporting-bar 14, which is secured to the pole in advance of the bracket 4 and extends transversely in a direction opposite the said bracket. By this method of mounting the equalizer-beam and evener they are fulcrumed, respectively, at opposite sides of the pole, and consequently at opposite sides of the line of direct draft.

It is unnecessary to detail at length the theory underlying the equalization of the draft-animals, as it is well understood that this simply involves the employment of counteracting leverage to equalize the efforts of the animals located at various distances from the line of draft, and in the construction shown harnessed to the singletrees 15 and 16, carried at the opposite ends of doubletrees 17 and 18, pivotally connected by clevises 19 and 20 to the equalizer-beam 13 at proper points to cause an equalization of draft through the medium of the equalizer or draft lever 5. The essential feature of my invention, however, is that side draft is absolutely prevented by the location of the fulcrums of the equalizer and equalizer-beam at opposite sides of the direct line of draft, or, in other words, at opposite sides of the tongue. Thus when the draft-animals are harnessed to a vehicle equipped with my equalizer the side draft exerted in one direction through the connection of the equalizer-beam with the supporting-arm 14 will be equalized by the side draft exerted in the opposite direction by the equalizer located beyond the opposite side of the line of draft upon the bracket 4.

Neither the bracket 4 nor the supporting-arm 14 is subjected to the strain of the draft, but both are designed merely to take the side thrust and sustain the counterbalancing or equalizing side drafts. The direct draft is sustained by a chain or the like 21, connected by a clevis 22 to the fulcrum-bolt 23 of the equalizer and connected at its opposite extremity to the frame of the vehicle.

If desired, the several elements comprising my equalizer might be mounted upon the under side of the tongue to remove the weight of the tongue or pole from the necks of the horses.

What I claim is—

1. A draft-equalizer comprising a beam or pole, a front equalizing-lever extending from one side of the pole, fulcrumed between its ends and having its inner end located directly over the beam or pole, the rear equalizing-lever located at the other side of the beam or pole, fulcrumed between its ends and having its inner end located directly over the beam or pole, connections between the corresponding arms of the lever, and the doubletrees 17 and 18 connected with the ends of the front equalizing-lever and provided with singletrees, the doubletree 17 being centrally connected with the inner end of the front lever at a point directly over the beam or pole, whereby its singletrees lie at opposite sides of the same, substantially as described.

2. A draft-equalizer comprising a beam or pole, the front equalizing-lever having its inner end arranged over the beam or pole and extending from one side of the same and fulcrumed between its ends, the rear equalizing-lever fulcrumed between its ends and extending from the other side of the pole, connections between the corresponding arms of said levers, whiffletrees connected with the ends of the front lever, and a chain extending rearward from the fulcrum of the rear equalizing-lever, substantially as described.

In testimony that I claim the foregoing as my own I have hereto affixed my signature in the presence of two witnesses.

<p style="text-align:center">his<br>JULE × BERGERON.<br>mark</p>

Witnesses:
JOHN C. STEVENS,
WALTER M. CROW.